United States Patent
Ullrich et al.

(10) Patent No.: US 9,786,175 B1
(45) Date of Patent: Oct. 10, 2017

(54) AVAILABILITY ESTIMATION METHOD FOR PARKING LOTS BASED ON INCOMPLETE DATA

(71) Applicants: Oliver Ullrich, Miami Beach, FL (US); Naphtali Rishe, Miami Beach, FL (US)

(72) Inventors: Oliver Ullrich, Miami Beach, FL (US); Naphtali Rishe, Miami Beach, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/252,383

(22) Filed: Aug. 31, 2016

(51) Int. Cl.
| | |
|---|---|
| *G08G 1/00* | (2006.01) |
| *G08G 1/14* | (2006.01) |
| *G08G 1/065* | (2006.01) |
| *G06K 9/00* | (2006.01) |

(52) U.S. Cl.
CPC ............ *G08G 1/142* (2013.01); *G08G 1/065* (2013.01); *G08G 1/146* (2013.01); *G06K 9/00785* (2013.01); *G06K 2209/23* (2013.01)

(58) Field of Classification Search
CPC ......... G08G 1/142; G08G 1/065; G08G 1/146
USPC .............. 340/932.2, 901–905, 539.1, 539.11
See application file for complete search history.

(56) References Cited

U.S. PATENT DOCUMENTS

2012/0182160 A1* 7/2012 Hod ..................... G08G 1/0116
340/934

* cited by examiner

*Primary Examiner* — Daryl Pope
(74) *Attorney, Agent, or Firm* — Saliwanchik, Lloyd & Eisenschenk (57) ABSTRACT

Methods and systems for monitoring parking areas and/or recommending a parking spot or a parking area to a driver are provided. The methods and systems can operate using incomplete camera or sensor coverage and minimal additional overhead. A method for assigning parking locations can include providing a first parking area and a second parking area, providing a means for determining a first parking area density and a means for determining a second parking area density, calculating a first parking index for the first parking area and a second parking index for the second parking area, providing a user interface suitable for assigning parking areas to drivers, and providing an assigned parking area based on the means for determining the first parking area density, the means for determining the second parking area density, the first parking index, and the second parking index.

20 Claims, 4 Drawing Sheets

AVAILABILITY ESTIMATION METHOD FOR PARKING LOTS BASED ON INCOMPLETE DATA

STATEMENT OF GOVERNMENT SUPPORT

This invention was made with government support under Award No. IIS-213026 awarded by the National Science Foundation (NSF) and under Grant No. ARI73 awarded by U.S. DOT. The government has certain rights in the invention.

BACKGROUND OF INVENTION

Searching for a parking spot can be inconvenient and waste resources such as time, fuel, and money. Furthermore, in large parking lots and parking garages, it is often difficult for a driver to know what parking areas have spots available and which of these areas best meet their needs. Therefore, there is always a demand for systems and methods that can assist drivers in finding available parking spots in the most desirable locations.

BRIEF SUMMARY

Embodiments of the present invention include methods and systems for monitoring parking areas. Embodiments of the present invention can also recommend a parking spot or a parking area to a driver. Embodiments of the present invention can also operate using incomplete camera or sensor coverage and minimal additional overhead (e.g., by using existing security system cameras or car counters).

Embodiments of the present invention include methods for assigning parking locations. A method according to an embodiment of the present invention can include separating a parking lot into parking areas. The method can further include providing a means for determining parking area density (parking area density is defined as the percentage of parking spots occupied in a given parking area). The means for determining parking area density can include, for example, security cameras or other types of cameras incorporated with image recognition software, car counters that count the number of cars entering and/or exiting a parking area, or individual parking spots sensors. Individual parking sensors can include weight indicators under parking spots, laser indicators, or other devices that can determine whether a vehicle is parked in a particular parking space.

A system for monitoring parking can include a means for determining a first parking area density and a means for determining a second parking area density, and a mainframe configured to determine or receive a first parking index for the first parking area and a second parking index for the second parking area. The mainframe can be connected to the means for determining the first parking area density and the means for determining the second parking area density. A user interface can be connected to the mainframe and be suitable for assigning parking spaces to drivers, and the mainframe can provide an assigned parking area based on the means for determining the first parking area density, the means for determining the second parking area density, the first parking index, and the second parking index. The mainframe can communicate to drivers through the user interface.

DETAILED DISCLOSURE

Embodiments of the present invention include methods and systems for monitoring parking areas. Embodiments of the present invention can also recommend a parking spot or a parking area to a driver. Embodiments of the present invention can operate using incomplete camera or sensor coverage (i.e., incomplete data) and minimal additional overhead (e.g., by using existing security system cameras or car counters) and operate with real-time data and give real-time recommendations.

Embodiments of the present invention allow for real-time and predictive advice on where to park, and on the relative attractiveness of available parking. Instead of relying on equipping each parking slot with electronic sensor modules, which is often cost-prohibitive, embodiments of the present invention can yield reliable results by applying image recognition software, heuristics, and stochastic methods to data collected by already available camera systems or other means for measuring parking density (i.e., the percentage of parking spots that are occupied in a given parking area). Embodiments of the present invention can continuously observe multiple parking areas and can be particularly useful when a parking lot is large and/or has too many entry and exit lanes to be completely covered by sensor systems. Embodiments of the present invention can also be utilized in conjunction with simulation models, e.g., event-based or agent-based models, and other predictive models.

Embodiments of the present invention include methods for assigning parking locations. A method according to an embodiment of the present invention can include separating a parking lot into parking areas. The method can further include providing a means for determining parking area density (parking area density is defined as the percentage of parking spots occupied in a given parking area). The means for determining parking area density can include, for example, security cameras or other types of cameras incorporated with image recognition software, car counters that count the number of cars entering and/or exiting a parking area, or individual parking spots sensors. Individual parking sensors can include weight indicators under parking spots, laser indicators, or other devices that can determine whether a vehicle is parked in a particular parking space.

If the means for determining a parking areas parking density does not capture the entire parking area (e.g., if security cameras or individual parking sensors can only capture a fraction of the entire parking area), the parking area density that is measured for part of the parking area can be extrapolated to the entire area. This can be reasonably assumed because parking spots within a given parking area have relatively similar parking indices. Parking areas with lower parking indices can be assumed to have the same or less parking density than those with higher indices, which is especially useful when some parking areas do not have a means for determining parking density. Parking areas with higher parking indices can be assumed to have the same or greater parking densities than areas with lower parking indices. For example, when a first parking area has a parking index of 100 and a density of 100 and a second parking area has a parking index of 50 and a density of 50, if a third parking area has a parking index of 70, the information can be linearly (or otherwise) extrapolated to determined that the third parking area has a parking density somewhere between the first and second parking area densities (e.g., 70).

The parking index of each spot can be indicative of its relative level of desirability. Each parking area can also have a parking index reflective of its relative level of desirability. The parking areas can be determined by grouping individual spots according to each individual spot's parking index. For example, parking spots with parking indices of 60 to 80 may be grouped into one parking area and the parking index of a parking area can be the average, mean, or median of the parking spots within the parking area. Instead of a parking indices, a rank (e.g., 1, 2, 3, etc) can be assigned to parking areas or they can be given a verbal que such as "preferred, premium, standard, economy, etc." These parking indices, ranks, or verbal ques may be particularly useful when there is a fee to park and the fee is reflective of each parking area's parking index.

The method can further include providing a user interface suitable for assigning parking spaces or parking areas to drivers. The user interface can be an automated sign at the entrance of a parking lot indicating which parking area for entering drivers to park their car and can suggest multiple different areas taking into account multiple possible destinations. The user interface can also include a terminal where a driver can enter their destination (assuming the parking lot can be used for drivers seeking to go to multiple destinations) and a parking area or parking spot can be assigned taking into account their destination. In addition, the parking spot and parking area indices can change depending on a drivers destination input.

Parking indices can be determined in multiple ways. Considering one focal point (or destination), the parking indices can be determined by the distance from the focal point to each parking spot or parking area. Considering two, three, four, or more focal points (or destinations), the parking indices can be determined by the cumulative distance to each focal point or the average distance to each focal point. The parking indices can be weighted depending on the desirability of each destination. In addition, parking indices can change based on weather, day of the week, whether the parking area is covered, and time of day. For instance, a parking area (or parking spots) parking index may go up during rain or snow if it is covered, because this feature would become more desirable. Time of day may be important because certain destinations may draw greater numbers at certain times. For example, a restaurant may draw more people during the evening than the morning. If the assigned parking indices are inconsistent with real-world parking patterns, the mechanism or method for calculating parking indices should be revisited.

Parking indices may also be determined by interviewing local experts, or by evaluating data collected over time (or historic data). That is, a mainframe can keep track of data gathered by the means for determining parking area densities and continuously update parking indices. This can be analyzed by day of the week, weather patterns, time of day, etc. For example, if the mainframe gathers data showing that a given parking area averages 50% density on Tuesday at 3 pm, the parking index at that particular time and day may be 50. In other embodiments, parking indices can be directly input to the mainframe by a system manager or can be determined by experts or personal observations. Parking indices can also be determined by distance to exits and entrances of parking lots.

User preferences' definitions that can be incorporated in this technology are described in U.S. patent application "User Interface for Co-Optimizing Weight Factors", Ser. No. 14/877,379, which is incorporated herein by reference in its entirety. In addition, recommendations and comparisons of the current or predictive state of parking garages can be incorporated into embodiments of the present invention, as described in U.S. patent application "Emissions Reduction in Vehicle Parking", Ser. No. 14/660,283, which is incorporate herein by reference in its entirety.

A mainframe can be provided and connected to the means for measuring parking area density and also connected to the user interface(s). The mainframe can include volatile and non-volatile memory, software, one or more processors, and connections for the user interfaces and parking density sensors. The software can include functions for determining and assigning a parking area. The software can also include image recognition software to determine parking density in a given area. The image recognition software can be custom built or commercially supplied. A full ratio $R_f$ and an empty ratio $R_e$ can be input to the mainframe to indicate whether a parking area is full or empty. For example, the full ratio $R_f$ can be 0.95 and the empty ratio $R_e$ can be 0.05. The parking area density $R_o$ can then be compared to the full ratio $R_f$ and the empty ratio $R_e$. If the parking area density $R_o$ is less than or equal to the empty ratio $R_e$, the entire parking area can be denoted as empty. If the parking area density $R_o$ is greater than or equal to the full ratio $R_f$, the entire parking area can be denoted as full. Those areas where the parking area density $R_o$ is between the full ratio $R_f$ and the empty ratio $R_e$ can be considered the "active rim." The active rim areas can be the areas assigned to drivers entering the parking lot and can contain the most desirable parking spots.

If a first parking area density is greater than or equal to the full ratio $R_f$, a second parking area can be assigned. If a first parking area density is less than or equal to full ratio $R_f$, the first parking area can be assigned. If the first parking area density is less than the empty ratio $R_e$, the first parking can be assigned, or, if the second parking area density is less than the empty ratio Re, the second parking area can be assigned. If multiple parking areas have parking area densities that are below the full ratio $R_f$, the parking area with the highest parking index can be assigned.

Figure 5:
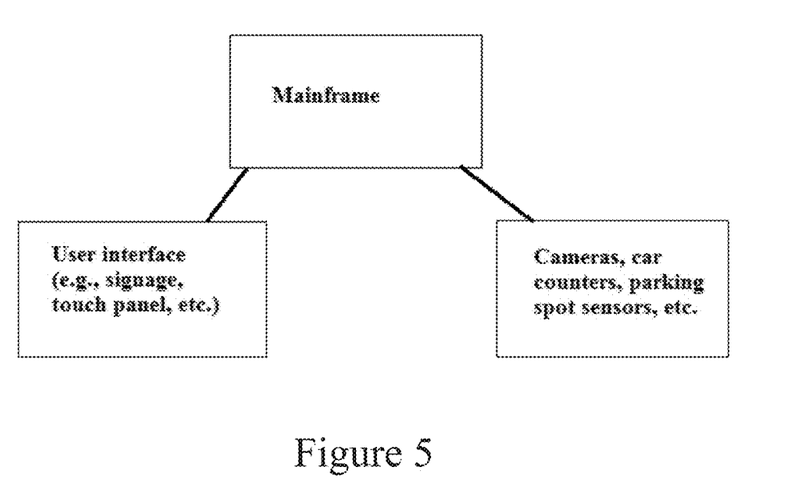
FIG. 5 is a diagram of a mainframe according to the present invention.

A system for monitoring parking can include a means for determining a first parking area density and a means for determining a second parking area density, and a mainframe configured to determine or receive a first parking index for the first parking area and a second parking index for the second parking area. The mainframe can be connected to the means for determining the first parking area density and the means for determining the second parking area density. A user interface can be connected to the mainframe and be suitable for assigning parking spaces to drivers, and the mainframe can provide an assigned parking area based on the means for determining the first parking area density, the means for determining the second parking area density, the first parking index, and the second parking index. The mainframe can communicate to drivers through the user interface. The systems for monitoring parking according to the embodiments of the present invention can implement all of the features of the methods described above. The logic functions can be implemented through a mainframe as shown in FIG. 5.

Figure 1:
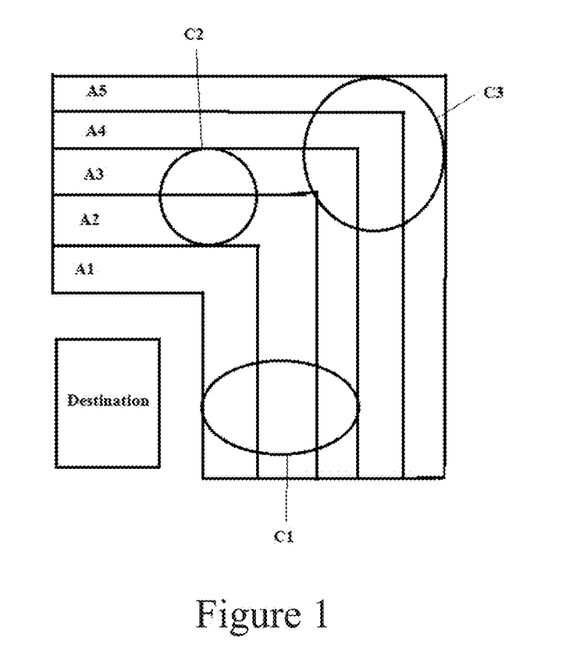
FIG. 1 is a diagram of a parking lot having a single destination according to an embodiment of the present invention.

FIG. 1 shows an implementation of an embodiment of the present invention considering a parking lot with a single destination. The parking lot can be organized into five different parking areas: A1, A2, A3, A4, and A5. The areas can be chosen according to similar parking indices. For example, the indices may be chosen according to distance from the destination and parking area A2 may contain all parking spots within 40 to 60 meters of the destination. Therefore, the parking index of A1 would be greater than A2, A2 greater than A3, and so on. A first means for determining parking density C1, a second means for determining parking density C2, and a third means for determining parking density C3 can be provided. The first means for determining parking density C1 may only cover a portion of A1, A2, and A3 (as outlined by the circle representing C1). The second means for determining parking density C2 may only cover a portion of A2 and A3. The third means for determining parking density C3 may only cover a portion of A3, A4, and A5. If the means for determining parking area densities for the same parking area are different, they can be averaged. For example, if C1 is measuring a parking density of 80 for A2 and C2 is measuring a parking density of 70 for A2, these numbers can be averaged using software in the mainframe to give A2 an overall parking density of 75.

The means for measuring parking density (C1, C2, and C3) in FIG. 1 are cameras with coverages as outlined by circles/ovals. However, the means for measuring parking density for each area could be car counters, which can be on the entrance or the exit of each parking area or the parking lot as a whole. That is, knowing the parking index of each area and the number of cars in the lot, the best parking areas that are available can be determined because drivers will naturally tend to choose spots with the highest parking index. In addition, the means for measuring parking density (C1, C2, and C3) may simply be a routine examination by an employee or a sampling of individual parking spot sensors. In a counter factual of FIG. 1, in which A3 does not have a means for measuring parking density, the parking density of parking areas A2 and A4 could be averaged to approximate the parking area density of parking area A3.

In FIG. 1, a user interface including signage can be used to communicate to incoming drivers which parking area to go to. The determinations can be made by the mainframe using software and logic as discussed throughout this specification. The signage can be overhead or on the side of the entrance and the mainframe can supply the necessary information to the user interface.

Figure 2:
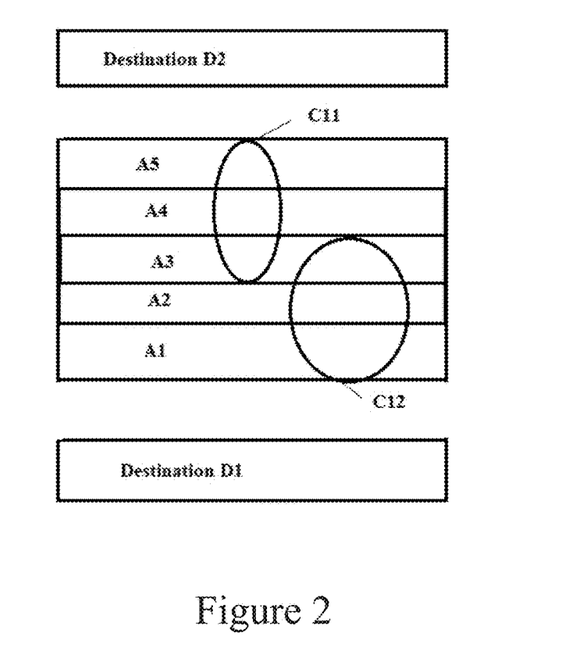
FIG. 2 is a diagram of a parking lot having two destinations, according to an embodiment of the present invention.

FIG. 2 shows an application of an embodiment of the present invention where there is one parking lot having five parking areas (A1, A2, A3, A4, and A5) and two destinations (D1 and D2). In this case the user interface can recommend a parking area depending on which destination a driver intends to visit. For example, overhead signage at the entrance of the parking lot may tell drivers to go to parking area A2 for Destination D1, and parking area A5 for Destination D2. In other embodiments, a driver may be able to select from multiple different destinations and the mainframe may communicate back to the drivers letting them know which parking area to go to.

Figure 3:
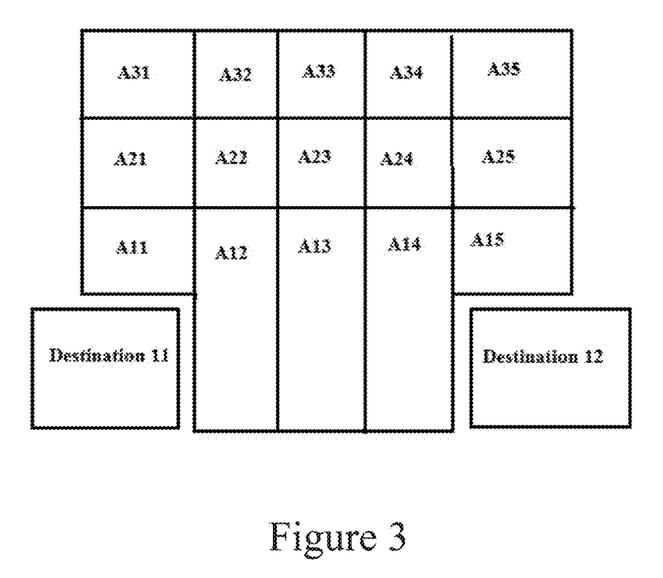
FIG. 3 is a diagram of a parking lot having two destinations, according to an embodiment of the present invention.

FIG. 3 is a diagram of a more complicated parking lot consisting of 15 parking areas (A11, A12, A13, A14, A15, A21, A22, A23, A24, A25, A31, A32, A33, A34, and A35) and two destinations (D1 and D2). In this case, parking area A13 may be covered. Therefore, on days that are hot, at times of days that are hot, and when there is rain, the parking index of parking area A13 can go up relative to the other areas.

Figure 4:
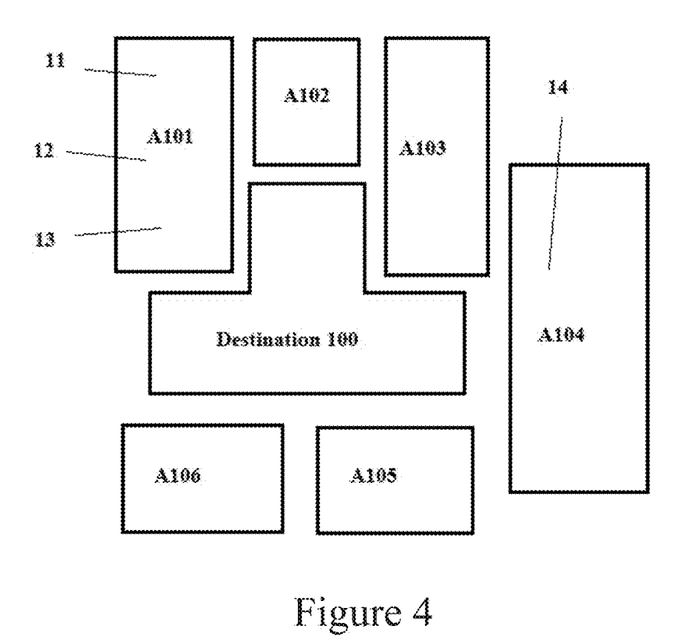
FIG. 4 is a diagram of a system according to the present invention.

FIG. 4 is a diagram of six parking areas (A101, A102, A103, A104, A105, and A106) and a destination D100. In parking area A101 of FIG. 4 there is occupied parking 13, an active rim 12, and empty or available parking 11. The globally best available parking spots 14 may be present in area A104. All of the methods and systems discussed above can similarly be applied to the situation present in FIG. 4.

FIG. 5 is a diagram of a system according to an embodiment of the present invention. FIG. 5 shows a mainframe, which can be connected to means for determining parking area density (e.g., cameras, car counters, and parking sensors) and user interfaces. The user interfaces can include signage and touch panels.

Figure 6:
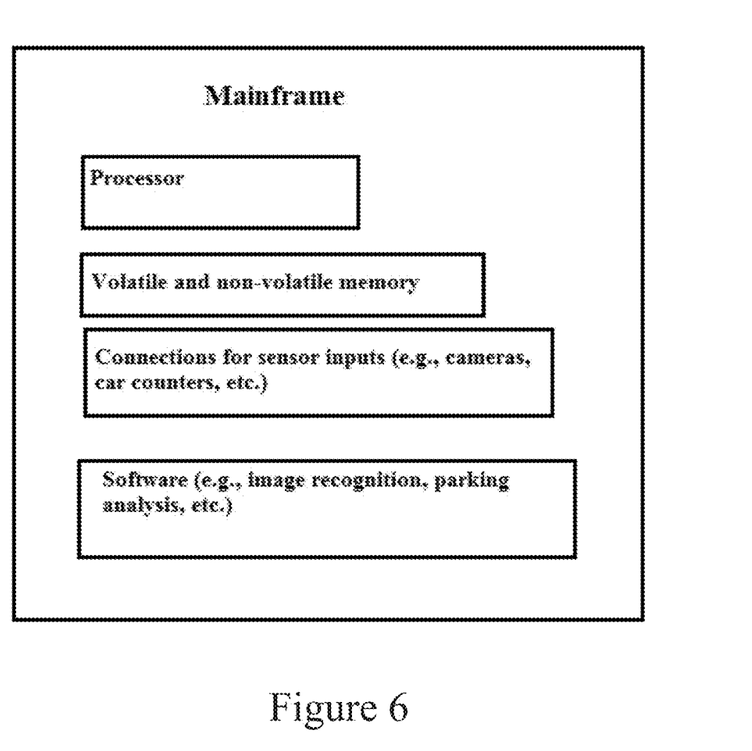
FIG. 6 is a diagram of a mainframe according to an embodiment of the present invention.

FIG. 6 is a diagram showing a mainframe according to an embodiment of the present invention. The mainframe can include on or more processors, volatile and non-volatile memory, connections for sensor inputs, and software than can be stored in non-volatile memory. During operation the non-volatile memory and processors can execute the software implements the described methods.

Figure 7:
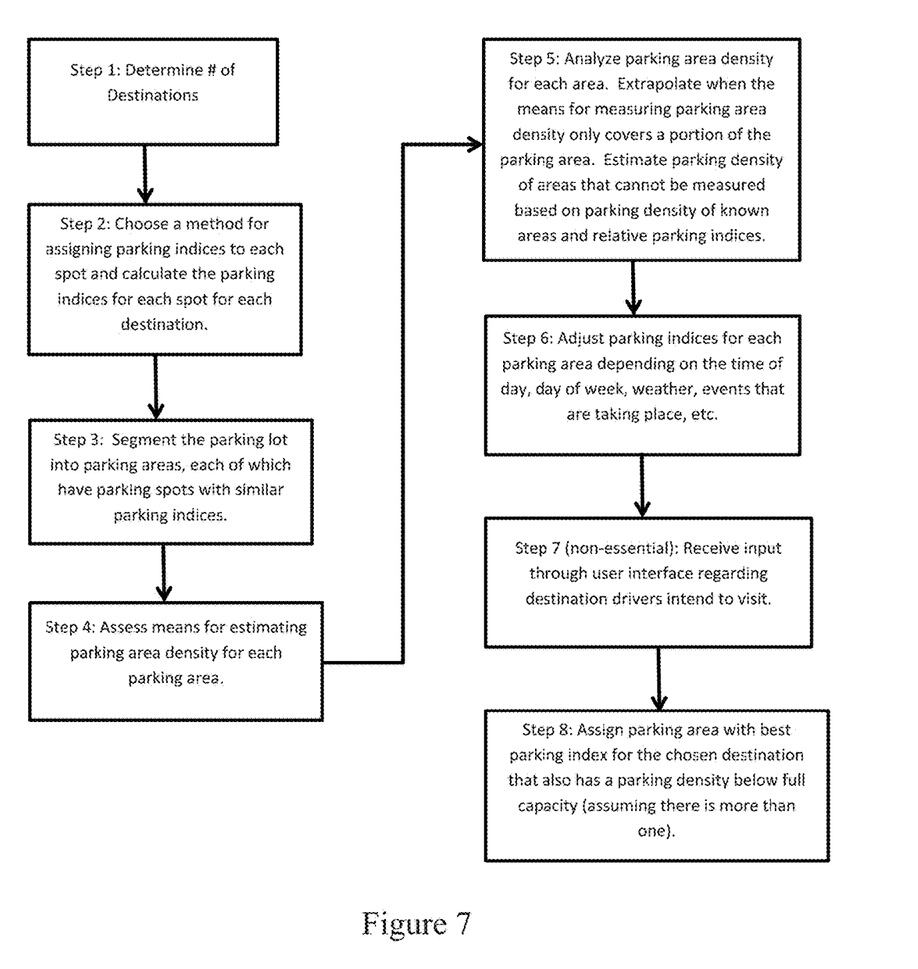
FIG. 7 is a flow chart of a method for monitoring parking according to an embodiment of the present invention.

FIG. 7 is a flow chart of a method for monitoring parking according to an embodiment of the present invention. According to a method according to an embodiment of the present invention, step 1 is to determine the number of destinations for a given parking lot. Step 2 is to choose a method for assigning parking indices to each parking spot. The parking indices for each spot and each area can be calculated separately for each destination. In step 3, the parking lot is segmented into parking areas with similar parking indices. In step 4, the means for estimating parking area density for each parking areas is assessed. In step 5, the parking area density for each area is analyzed. For areas where only a portion of the parking area is monitored by a means for measuring parking area density, the partial parking area density measurement can be extrapolated to an entire parking area. For parking areas that lack a means for measuring parking density, an estimation can be made based on the remaining parking areas and their indices (as discussed above). In step 6, the parking indices for each parking area can be adjusted based on the time of day, day of the week, weather, events that are taking place, etc. In addition, the adjustments made at step 6 can be incorporated earlier in the process (e.g., at step 2). In step 7, a user can input a destination through a user interface which can be assessed by the mainframe in determining which parking area to recommend. In step 8, the mainframe assesses all the information and assigns a parking area to a driver.

The methods and processes described herein can be embodied as code and/or data. The software code and data described herein can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A method for assigning parking locations, the method comprising:
providing a first parking area and a second parking area;
providing a means for determining a first parking area density and a means for determining a second parking area density;
calculating a first parking index for the first parking area and a second parking index for the second parking area;
providing a user interface suitable for assigning parking area to drivers; and
providing an assigned parking area based on the means for determining the first parking area density, the means for determining the second parking area density, the first parking index, and the second parking index.

Embodiment 2

The method for assigning parking locations of Embodiment 1, wherein the means for determining parking area density includes a camera, or video recorder, and image recognition technology.

Embodiment 3

The method for assigning parking locations of any of Embodiments 1 to 2, wherein the means for determining a first parking area density includes a car counter.

Embodiment 4

The method for assigning parking locations of any of Embodiments 1 to 3, further comprising providing a full ratio $R_f$ and an empty ratio $R_e$.

Embodiment 5

The method for assigning parking locations of any of Embodiments 1 to 4, wherein if the first parking area density is greater than the full ratio $R_f$, the second parking area is the assigned parking area.

Embodiment 6

The method for assigning parking locations of any of Embodiments 1 to 5, wherein if the first parking area density is greater than the full ratio $R_f$, the second parking area is the assigned parking area, or, if the second parking area density is greater than the full ratio $R_f$, the first parking area is the assigned parking area.

Embodiment 7

The method for assigning parking locations of any of Embodiments 1 to 6, wherein when the means for determining the first parking area density only encompasses part of the first parking area, the first parking area density is assumed to be indicative of the entire first parking area.

Embodiment 8

The method for assigning parking locations of any of Embodiments 1 to 7, wherein if the first parking area density is less than the empty ratio $R_e$, the first parking area is the assigned parking area, or, if the second parking area density is less than the empty ratio $R_e$, the second parking area is the assigned parking area.

Embodiment 9

The method for assigning parking locations of any of Embodiments 1 to 8, wherein the first parking index or the second parking index are determined by a distance to one focal point.

Embodiment 10

The method for assigning parking locations of any of Embodiments 1 to 8, wherein the first parking index or the second parking index are determined by cumulative distance of two or more focal points.

Embodiment 11

The method for assigning parking locations of any of Embodiments 1 to 8, wherein the first parking index or the second parking index are determined by interviewing local experts, or by evaluating historic data captured by the means for determining a first parking area density and the means for determining the second parking area density.

Embodiment 12

The method for assigning parking locations of any of Embodiments 1 to 11, further comprising providing a third parking area having a third parking index and a third parking area density, and a means for determining a third parking area density.

Embodiment 13

The method for assigning parking locations of any of Embodiments 1 to 12, wherein if the third parking area index is greater than the first parking area index and the first parking area density is greater than the full ratio, the third parking area is not the assigned parking area.

Embodiment 14

The method for assigning parking locations of any of Embodiments 1 to 13, wherein if the third parking area index is less than the first parking area index, the third parking area density is assumed to be the first parking area density.

Embodiment 15

The method for assigning parking locations of any of Embodiments 1 to 14, wherein the user interface is suitable for providing the assigned parking area based on a first destination and a second destination.

Embodiment 16

The method for assigning parking locations of any of Embodiments 1 to 15, wherein the user interface is suitable for receiving an input of a first destination or a second destination.

Embodiment 17

The method for assigning parking locations of any of Embodiments 1 to 16, wherein the full ratio $R_f$ is 0.95 and the empty ratio $R_e$ is 0.05.

Embodiment 18

The method for assigning parking locations of any of Embodiments 1 to 17, wherein the means determining a first parking area density is a sampling of individual parking spot measurements.

Embodiment 19

The method for assigning parking locations of any of Embodiments 1 to 18, wherein one or more of the first parking index, the second parking index, and the third parking index change depending on a time of day.

Embodiment 20

The method for assigning parking locations of any of Embodiments 1 to 19, wherein one or more of the first parking index, the second parking index, and the third parking index change depending on a day of the week.

Embodiment 21

The method for assigning parking locations of any of Embodiments 1 to 19, wherein one or more of the first parking index, the second parking index, and the third parking index change depending on weather.

Embodiment 101

A system for monitoring parking, comprising:
a first parking area and a second parking area;
a means for determining a first parking area density and a means for determining a second parking area density;
a mainframe configured to determine or receive a first parking index for the first parking area and a second parking index for the second parking area, and wherein the mainframe is connected to the means for determining the first parking area density and the means for determining the second parking area density; and
a user interface connected to the mainframe and suitable for assigning parking spaces to drivers, wherein the mainframe provides an assigned parking area based on the means for determining the first parking area density, the means for determining the second parking area density, the first parking index, and the second parking index.

Embodiment 102

The system for monitoring parking of Embodiment 101, wherein the means for determining parking area density includes a camera, or video recorder, and image recognition technology.

Embodiment 103

The system for monitoring parking of any of Embodiments 101 to 102, wherein the means for determining a first parking area density includes a car counter.

Embodiment 104

The system for monitoring parking of any of Embodiments 101 to 103, wherein the mainframe is configured to determine or receive a full ratio $R_f$ and an empty ratio $R_e$.

Embodiment 105

The system for monitoring parking of any of Embodiments 101 to 104, wherein the mainframe is programmed such that if the first parking area density is greater than the full ratio $R_f$, the second parking area is the assigned parking area.

Embodiment 106

The system for monitoring parking of any of Embodiments 101 to 105, wherein the mainframe is programmed such that if the first parking area density is greater than the full ratio $R_f$, the second parking area is the assigned parking area, or, if the second parking area density is greater than the full ratio $R_f$, the first parking area is the assigned parking area.

Embodiment 107

The system for monitoring parking of any of Embodiments 101 to 106, wherein the means for determining the first parking area density only encompasses part of the first parking area.

Embodiment 108

The system for monitoring parking of any of Embodiments 101 to 107, wherein the mainframe is programmed such that if the first parking area density is less than the empty ratio $R_e$, the first parking area is the assigned parking area, or, if the second parking area density is less than the empty ratio $R_e$, the second parking area is the assigned parking area.

Embodiment 109

The system for monitoring parking of any of Embodiments 101 to 108, wherein the mainframe determines the first parking index or the second parking index by the distance to one focal point.

Embodiment 110

The system for monitoring parking of any of Embodiments 101 to 109, wherein the mainframe determines the first parking index or the second parking index by the cumulative distance of two or more focal points.

Embodiment 111

The system for monitoring parking of any of Embodiments 101 to 110, wherein the mainframe determines the first parking index or the second parking index by using information gained by interviewing local experts, or by using historic data captured by the means for determining a first parking area density and the means for determining the second parking area density.

Embodiment 112

The system for monitoring parking of any of Embodiments 101 to 111, further comprising a third parking area having a third parking index and a third parking area density, and a means for determining the third parking area density that is connected to the mainframe.

Embodiment 113

The system for monitoring parking of any of Embodiments 101 to 112, wherein if the third parking area index is greater than the first parking area index and the first parking area density is greater than the full ratio, the third parking area is not the assigned parking area.

Embodiment 114

The system for monitoring parking of any of Embodiments 101 to 113, wherein the mainframe determines that if the third parking area index is less than the first parking area index, the third parking area density is assumed to be the first parking area density.

Embodiment 115

The system for monitoring parking of any of Embodiments 101 to 114, wherein the user interface and the mainframe are suitable for providing the assigned parking area based on a first destination and a second destination.

Embodiment 116

The system for monitoring parking of any of Embodiments 101 to 115, wherein the user interface and the mainframe are suitable for receiving an input of a first destination or a second destination.

Embodiment 117

The system for monitoring parking of any of Embodiments 101 to 116, wherein the full ratio $R_f$ is 0.95 and the empty ratio $R_e$ is 0.05.

Embodiment 118

The system for monitoring parking of any of Embodiments 101 to 117, wherein the means determining a first parking area density is a sampling of individual parking spot measurements.

Embodiment 119

The system for monitoring parking of any of Embodiments 101 to 118, wherein the mainframe is programmed to change one or more of the first parking index, the second parking index, and the third parking index depending on a time of day.

Embodiment 120

The system for monitoring parking of any of Embodiments 101 to 119, wherein the mainframe is programmed to change one or more of the first parking index, the second parking index, and the third parking index depending on a day of the week.

Embodiment 121

The system for monitoring parking of any of Embodiments 101 to 120, wherein the mainframe is programmed to change one or more of the first parking index, the second parking index, and the third parking index change depending on weather.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

What is claimed is:

1. A method for assigning parking locations, the method comprising:
   providing a first parking area and a second parking area;
   providing a means for determining a first parking area density and a means for determining a second parking area density;
   calculating a first parking index for the first parking area and a second parking index for the second parking area;
   providing a user interface suitable for assigning parking areas to drivers; and
   providing an assigned parking area based on the means for determining the first parking area density, the means for determining the second parking area density, the first parking index, and the second parking index,
   the first parking index and the second parking index being indicators of relative level of desirability, and
   the first parking area or the second parking area that has a highest parking index being assigned to the assigned parking area when the first parking area density and second parking area density are below a full ratio $R_f$ that indicates that a parking area is full.

2. The method for assigning parking locations of claim 1, wherein the means for determining the first parking area density includes a camera, or video recorder, and image recognition technology.

3. The method for assigning parking locations of claim 2, wherein the means for determining the first parking area density includes a car counter.

4. The method of claim 2, further comprising providing an empty ratio $R_e$, wherein if the first parking area density is greater than the full ratio $R_f$, the second parking area is the assigned parking area.

5. The method for assigning parking locations of claim 3, wherein when the means for determining the first parking area density only encompasses part of the first parking area, the first parking area density is assumed to be indicative of the entire first parking area.

6. The method for assigning parking locations of claim 5, wherein the first parking index is calculated by a distance to one focal point.

7. The method for assigning parking locations of claim 5, wherein the first parking index is calculated by a cumulative distance of two or more focal points.

8. The method for assigning parking locations of claim 5, wherein the first parking index is determined by historic data captured by the means for determining the first parking area density.

9. The method for assigning parking locations of claim 8, wherein the user interface is suitable for providing the assigned parking area based on a first destination and a second destination.

10. The method for assigning parking locations of claim 5, wherein the means determining a first parking area density is a sampling of individual parking spots from the first parking area.

11. A system for monitoring parking comprising:
a means for determining a first parking area density and a means for determining a second parking area density;
a mainframe configured to determine or receive a first parking index for the first parking area and a second parking index for the second parking area, and wherein the mainframe is connected to the means for determining the first parking area density and the means for determining the second parking area density; and
a user interface connected to the mainframe and suitable for assigning parking areas to drivers, the mainframe providing an assigned parking area based on the means for determining the first parking area density, the means for determining the second parking area density, the first parking index, and the second parking index,
the first parking index and the second parking index being indicators of relative level of desirability, and
the first parking area or the second parking area that has a highest parking index being assigned to the assigned parking area when the first parking area density and second parking area density are below a full ratio $R_f$ that indicates that a parking area is full.

12. The system for monitoring parking of claim 11, wherein the means for determining parking area density includes a camera, or video recorder, and image recognition technology.

13. The system for monitoring parking of claim 11, wherein the means for determining a first parking area density includes a car counter.

14. The system for monitoring parking of claim 12, wherein the mainframe is configured to determine or receive the full ratio $R_f$ and an empty ratio $R_e$, and wherein the mainframe is programmed such that if the first parking area density is greater than the full ratio $R_f$, the second parking area is the assigned parking area.

15. The system for monitoring parking of claim 12, wherein the means for determining the first parking area density only encompasses part of the first parking area.

16. The system for monitoring parking of claim 15, wherein the mainframe is programmed such that if the first parking area density is less than the empty ratio $R_e$, the first parking area is the assigned parking area.

17. The system for monitoring parking of claim 15 wherein the mainframe is programmed to change one or more of the first parking index and the second parking index depending on the time of day.

18. The system for monitoring parking of claim 15 wherein the mainframe is programmed to change one or more of the first parking index and the second parking index depending on a day of the week.

19. The system for monitoring parking of claim 15 wherein the mainframe is programmed to change one or more of the first parking index and the second parking index depending on weather.

20. A method for assigning parking locations, the method comprising:
providing a first parking area and a second parking area;
providing a camera or video recorder with image recognition technology for determining a first parking area density and a means for determining a second parking area density, wherein the camera or video recorder with image recognition technology only measures a portion of the first parking area;
determining a first parking index for the first parking area and a second parking index for the second parking area, wherein the first parking index and the second parking index are determined by the distance to one or more destinations;
providing a user interface and a mainframe suitable for assigning parking areas to drivers, wherein the user interface and the mainframe are suitable for having the drivers select from the one or more destinations and assigning a parking area based on the selected destination; and
providing a full ratio $R_f$ and an empty ratio $R_e$ to the mainframe;
if the first parking area density is greater than the full ratio $R_f$, the second parking area being the assigned parking area,
if the second parking area density is greater than the full ratio $R_f$, the first parking area being the assigned parking area, and
if the first parking area index and the second parking area index are both below the full ratio Rf, the first parking area or the second parking area that has a highest parking index being assigned to the assigned parking area.

* * * * *